United States Patent Office 2,992,271
Patented July 11, 1961

2,992,271
CATALYTIC OXIDATION OF ARALKYL COMPOUNDS
Allan S. Hay, Schenectady, N.Y., assignor to General Electric Company, a corporation of New York
No Drawing. Filed Mar. 27, 1956, Ser. No. 574,076
11 Claims. (Cl. 260—524)

This invention relates to a method of preparing aromatic carboxylic acids and other carbonyl compounds. More particularly, this invention is concerned with a method of preparing carboxylic acids or other carbonyl compounds which comprises oxidizing the alkyl side chains of aralkyl compounds, employing oxygen as the oxidizing agent.

Heretofore, a number of processes have been developed for using oxygen to oxidize the alkyl side chains of aralkyl compounds to form aromatic carboxylic acids. However, all of these prior art processes suffer from one or more of the following disadvantages. Low yields of oxidation products have been obtained. Relatively high reaction temperatures have been required. Reaction pressures above atmospheric pressure have been required. Large amounts of activators or promoters or initiators for the reaction have been required to be continuously supplied to the reaction mixture during the reaction.

It is an object of the present invention to provide a simple process for the oxidation of the alkyl side chains of aralkyl compounds to the corresponding aromatic carboxylic acids without any of the disadvantages inherent in prior art processes.

This and other objects of my invention are accomplished by passing oxygen into a solution of an aralkyl compound in acetic acid in the presence of a cobalt catalyst at a temperature of from about room temperature to 130° C., preferably from 90 to 115° C. after initiating the reaction with ozone. This process is based on my discovery that ozone is an outstanding initiator for the catalytic oxidation of aralkyl compounds to corresponding aromatic carboxylic acids. Ozone serves as the sole oxidation initiator in this process.

The term "aralkyl compound" as used in the present application refers to organic compounds containing an aromatic nucleus to which is bonded an alkyl radical. These alkyl radicals include methyl, ethyl, propyl, butyl, octyl, etc. radicals. The term "aralkyl compound" is thus seen to include aralkyl hydrocarbons such as the alkyl benzenes, and the various alkyl naphthalenes. In addition to hydrocarbon materials, the term also encompasses compounds containing oxygen. Thus, the term includes the three isomeric toluic acids as well as alkyl substituted diphenyl oxides. In addition, the term also includes alkyl substituted diphenyls. From this definition of the term "aralkyl compound" it is seen that the term includes compounds such as toluene, the three isomeric xylenes, the two isomeric trimethyl benzenes, ethyl benzene, the three isomeric toluic acids, p-methyl diphenyl oxide, p-methyl biphenyl, α-methyl naphthalene, etc.

By the process of the present invention, it is possible to prepare compounds such as o-toluic and o-phthalic acids from o-xylene, isophthalic and m-toluic acids from m-xylene, terephthalic and p-toluic acids from p-xylene, benzoic acid from methyl benzene, mesitylenic acid (3,5-dimethyl benzoic acid) and uvitic acid (5-methyl benzene-1,3-dicarboxylic acid) from mesitylene (1,3,5-trimethyl benzene), acetophenone and benzoic acid from ethyl benzene, α-naphthalene carboxylic acid from α-methyl naphthalene, etc.

The cobalt catalysts employed in the practice of the present invention are catalysts containing cobalt in its divalent state. Specific catalysts include cobaltous salts of carboxylic acids. Since the reaction is carried out in the presence of a large amount of acetic acid, the cobalt, regardless of its initial form, generally takes the form of the acetate in the reaction mixture. Therefore, any cobaltous salt of the type described which is soluble in acetic acid in an amount sufficient to form the desired cobalt ion concentration is satisfactory for the process. The preferred catalyst of my invention is cobaltous acetate tetrahydrate. However, other suitable cobaltous catalysts include the cobaltous salts of other lower aliphatic acids, such as, for example, cobaltous propionate, cobaltous formate, cobaltous butyrate, etc. In addition, cobaltous salts of aromatic carboxylic acids, such as the acids produced by my process, may also be employed as catalysts. Thus, I can employ salts such as cobaltous toluate, cobaltous terephthalate, cobaltous naphthenate, etc.

Although the exact effect of the ozone initiator on the reaction mixture of the present invention is not completely known, it has been observed that the ozone tends to change the color of the reaction mixture from the pink color which is typical of a solution containing cobaltous ions to the green solution characteristic of a cobaltic medium. After sufficient ozone has been added to the reaction mixture of the present invention to change the color of this reaction mixture from pink to green, the reaction becomes self-sustaining, i.e., the reaction proceeds without the addition of additional ozone. The net effect of the reaction is the oxidation to the corresponding carbonyl compounds of at least one of the alkyl carbon atoms which are bonded directly to the aromatic nucleus.

In carrying out the process of the present invention, the aralkyl compound, acetic acid, which acts as a solvent, and the cobaltous catalyst are added to a suitable reaction vessel and heated to the reaction temperature. At this time a mixture of ozone and oxygen, prepared by passing oxygen through a conventional ozone generator, is passed into the reaction mixture. The ozone mixture is fed into the reaction mixture until the color of the reaction mixture changes to the green color typical of the cobaltic ion. After the color change is observed, oxygen which is free of ozone may then be passed into the reaction mixture until the reaction is effected to the desired degree. Alternatively, the mixture of ozone and oxygen used to initiate the reaction may be passed into the reaction mixture throughout the entire course of the reaction without adverse effects. However, it should be understood that the reaction is self-sustaining after the solution changes to its green color and that no further ozone is needed after this time. It is thus seen that in my process, the oxygen serves as the oxidizing agent while the ozone serves primarily as an initiator for the reaction during its early stages. After the reaction is completed the aromatic carboxylic acid or acids are then separated from the reaction mixture by conventional methods.

The proportions of ingredients employed in my invention may vary within extremely wide limits and depend to some extent on the particular reactants employed, and the particular reaction conditions employed. However, with regard to the concentration of catalyst, satisfactory results have been obtained employing from 0.001 to 0.3 part by weight of the cobaltous catalyst per part of the acetic acid solvent. My preferred catalyst range is from about 0.01 to 0.1 part by weight of catalyst per part of acetic acid.

The amount of the aralkyl compound which is present in the reaction mixture at the start of the reaction may vary almost without limit since the catalyst and acetic acid will be effective in the oxidation of the aralkyl compound regardless of the amount present in the reaction mixture at any given time. In practice, I have obtained satisfactory results when employing in the starting mixture from 0.01 to 0.5 part by weight of the aralkyl compound per part of acetic acid. Preferably my reaction mixture at the start contains from 0.05 to 0.1 part by weight of the aralkyl compound per part of acetic acid. It is obvious that the ratio of aralkyl compound to acetic acid will vary during the course of the reaction since the aralkyl material is being continuously oxidized to the corresponding aromatic carboxylic acid.

As previously mentioned, the ozone employed in the practice of this invention is prepared with a conventional ozone generator. Generally, these ozone generators are capable of forming ozone from oxygen in such amounts that the concentration of ozone in oxygen varies up to about 12 to 14 percent by weight. The particular concentration of ozone with regard to the oxygen employed during the initial stages of my reaction is completely non-critical and any concentration of ozone found in the ozone generator output is satisfactory. The amount of ozone necessary to initiate the oxidation reaction of the present invention is very minute and satisfactory initiation has been obtained when employing a total amount of ozone equal to less than 0.04 part by weight of ozone per part of the cobaltous catalyst.

As previously described, the reaction is self-sustaining after initiation by the ozone and no further ozone is needed. However, the presence of ozone after initiation exerts no adverse effects on the reaction. It should be understood that there is no necessity for measuring the amount of ozone employed in the practice of the present invention, since it is easy to determine when sufficient ozone has been fed into the reaction mixture. Sufficient ozone is present in the reaction mixture when the reaction mixture changes from its original color to a color of green. The rate of addition of ozone to the reaction mixture may also vary almost without limit since the prime factor is the total amount of ozone added. Thus, where the ozone is added at a slow rate the reaction takes longer to initiate than when the ozone is added at a faster rate. I have found that the reaction is initiated at a satisfactory rate employing ozone at the rate of from 0.01 to 1.0 part by weight ozone per hour per part of cobaltous catalyst. Preferably I supply from 0.04 to 0.1 part per hour of ozone per part catalyst. Under these conditions it generally takes about thirty minutes for initiation of the reaction.

The rate of oxygen addition to the reaction is also not critical and may vary within any desired limits. Since the function of the oxygen is to oxidize the alkyl groups of the aralkyl compound to a carboxyl group, the rate of reaction is dependent to some extent on the amount of oxygen present at any given time in the area of the reaction mixture. Thus, the rate of reaction is faster with higher rates of oxygen addition than with lower rates of addition. Satisfactory results have been obtained adding oxygen to the reaction mixture at the rate of from 0.01 to 1.0, and preferably from 0.05 to 0.5 part by weight of oxygen per hour per part of aralkyl compound. It should be understood that in addition to employing pure oxygen as the oxidizing agent in my process, it is also possible to employ any oxygen containing gas in which the ingredient other than oxygen is inert under the conditions of the reaction. Thus, satisfactory results have been obtained employing air instead of pure oxygen in the feed gas to the reaction. In addition, the reaction proceeds satisfactorily employing mixtures of oxygen and inert gases such as helium, neon, xenon, kryton, argon, etc. as diluents for the oxygen in the feed gas. However, in the preferred embodiment of my invention I employ air as the oxidizing agent.

The process of this invention may be carried out at subatmospheric pressure, atmospheric pressure or superatmospheric pressures. However, there is no particular advantage to carrying out the process at any pressure other than atmospheric. This is true since the carrying out of the reaction at subatmospheric pressures requires the use of relatively complicated control equipment and decreases the yield of aromatic carboxylic acids obtained. In carrying out the reaction at elevated pressures the use of relatively expensive high temperature process equipment is required. Since the reaction proceeds at a reasonable rate at atmospheric pressure, it is not deemed advantageous to carry out the reaction at elevated pressures although there are no particular disadvantages to the use of elevated pressures other than the equipment cost problem.

The temperature of the reaction of the present invention may also vary within fairly wide limits. Satisfactory results are obtained with temperatures as low as room temperature (i.e. about 25° C.). However, I have found that at temperatures below about 90° C. the reaction proceeds at a relatively slow rate. Satisfactory results are obtained when running the reaction at temperatures from about 90° C. up to a temperature of about 160° C. However, I prefer to carry out the reaction at the reflux temperature of the reaction mixture. Since the reaction mixture contains a large amount of acetic acid as a solvent, and since this acid is generally the lowest boiling major constituent of the reaction mixture, it is found that the reflux temperature is near to the boiling point at atmospheric pressure of the acid, i.e. about 110–115° C.

In the oxidation of the alkyl side chains of the aralkyl compound to carboxyl groups one of the products of reaction is water. In carrying out the reaction it is found that the presence of a large amount of water has an adverse effect on the rate of reaction. Thus, when an amount of water in excess of about 0.1 part by weight per part of acetic acid is allowed to accumulate the reaction is substantially stopped. Therefore, I prefer to carry out the reaction under as nearly anhydrous conditions as possible and with an absolute maximum of about 0.1 part water per part acetic acid. The removal of water during the reaction is readily accomplished by allowing the water to distill from the reaction mixture as it is formed.

From the foregoing discussion it is apparent that the time required for a given conversion of the aralkyl compound to the corresponding aromatic carboxylic acid depends upon a number of factors. Thus, the time of reaction depends on the particular aralkyl compound employed, the particular catalyst employed, the temperature of the reaction, the rate of addition of ozone and oxygen, and the degree of water present in the reaction system. In the conversion of p-xylene to terephthalic acid and p-toluic acid percentage conversions greater than 80 percent have been attained in times as short as 4 to 5 hours when employing about 0.03 part by weight of catalyst per part of acetic acid at a temperature of about 110° C.

The following examples are illustrative of the practice of my invention and are not intended for purposes of limitation. In the examples all parts are by weight unless stated otherwise.

In all of the following examples an aralkyl compound, acetic acid, and cobaltous acetate tetrahydrate were added to a reaction vessel. The reaction vessel was then brought to the reaction temperature and stirred rapidly. At this time, oxygen and ozone were passed into the reaction mixture through an ozone generator. During at least the initial part of each run the ozone generator was in operation and converted approximately 2 percent by weight of the oxygen to ozone. In those runs in which ozone was not supplied to the reaction mixture during the entire course of the reaction, the ozone generator was turned off and the flow of oxygen was continued without the formation of ozone. Except in those examples in which the reaction was carried out at a temperature below about 100° C. the water formed by oxidation of the alkyl benzene was removed from the reaction system by distillation during the course of the reaction. After the reaction was terminated, the reaction mixture was allowed to cool to about room temperature and any precipitated aromatic carboxylic acids were filtered from the reaction mixture. Any aromatic carboxylic acids which remained in solution were recovered by evaporating the acetic acid solvent from the reaction mixture and extracting the cobalt salts with an aqueous HCl solution. The acids were then isolated by conventional methods.

Example 1

This example illustrates some of the process and composition variables which may be employed. In this example 1 part of acetic acid was mixed with various numbers of parts of p-xylene and cobaltous acetate tetrahydrate and the p-xylene was oxidized by the procedure previously described employing various rates and times of ozone addition and oxygen addition. The reaction was carried out at the reflux temperature of the reaction mixture which varied from about 105–110° C. The table below lists the number of parts of p-xylene employed and the number of parts of cobaltous acetate employed, the number of parts per hour of ozone employed, the number of hours in which ozone was added being in parentheses, the number of parts per hour of oxygen which were employed with the total hours in which oxygen was added being in parentheses, the percent conversion of the p-xylene to terephthalic acid and p-toluic acid.

| Run No. | p-Xylene, parts | Cobaltous Acetate, parts | Ozone, Parts/hour (hours) | Oxygen, Parts/hour (hours) | Percent Terephthalic Acid | Conversion, p-toluic Acid |
| --- | --- | --- | --- | --- | --- | --- |
| 1 | 0.082 | 0.0048 | 0.0038 (3.2) | 0.341 (3.2) | 26 | 54 |
| 2 | 0.082 | 0.0095 | 0.0038 (3.6) | 0.341 (3.6) | 17 | 52 |
| 3 | 0.131 | 0.0381 | 0.0021 (6.0) | 0.095 (19.5) | 34 | 48 |
| 4 | 0.032 | 0.0318 | 0.0013 (5.5) | 0.114 (5.5) | 32 | 49 |
| 5 | 0.082 | 0.0952 | 0.0038 (3.5) | 0.341 (3.5) | 33 | 38.5 |

Example 2

This example illustrates the fact that the catalyst and the acetic acid employed in the practice of the present invention are reusable and also illustrates the fact that once the reaction has been initiated by ozone, the further use of ozone is not required. In this example 1 part of acetic acid was mixed with 0.0548 part of p-xylene and 0.382 part of cobalt acetate tetrahydrate. This reaction mixture was then heated to the reflux temperature, which was about 110° C. and 0.234 part per hour of a mixture of oxygen and ozone containing about 2 weight percent of ozone were passed into the reaction mixture for 5 hours. At the end of this time the reaction mixture was allowed to cool and the precipitated terephthalic acid represented a 54 percent conversion of the starting xylene to terephthalic acid. At this time the reaction mixture was then reheated to a reflux temperature and 0.109 part of additional p-xylene was added. About 0.234 part per hour of pure oxygen was then passed into the reaction mixture for 2.2 hours at which time the reaction mixture was again cooled and the precipitated terephthalic acid was collected. After the reaction mixture was heated again to the reflux temperature 0.0548 additional part of p-xylene was added and 0.234 part per hour of pure oxygen was added for 4.5 hours. The solution was then cooled and the precipitated terephthalic acid was collected. The solution was once again heated to reflux temperature and 0.109 additional part of p-xylene was added and oxygen was again added for 2.0 hours at the rate of 0.234 part per hour. At this time the reaction mixture was allowed to cool and all of the reaction products were isolated. Based on the total number of parts of p-xylene employed throughout this series of runs, the percent conversion to terephthalic acid was 53 percent and the percent conversion to p-toluic acid was 32 percent.

Example 3

This example illustrates the preparation of isophthalic acid and m-toluic acid from m-xylene by the process of the present invention. One part of acetic acid was mixed with 0.124 part of m-xylene and 0.0381 part of cobaltous acetate tetrahydrate. This reaction mixture was heated to its reflux temperature of about 110° C. and 0.095 part per hour of oxygen containing about 2 percent by weight of ozone was passed into the reaction mixture for 1.25 hours. At the end of this time the ozone generator was cut off and pure oxygen at the rate of 0.095 part per hour was added to the reaction mixture for about 15 additional hours. At the end of this time the reaction products were isolated and the conversion of the m-xylene to isophthalic acid was 67 percent and the conversion to toluic acid was 21 percent.

Example 4

This example illustrates further the reusability of the acetic acid solvent and the catalyst of the present invention and illustrates also the fact that ozone is required only as an initiator in the reaction. One part of acetic acid, 0.164 part of m-xylene and 0.057 part of cobaltous acetate tetrahydrate were mixed and heated to their reflux temperature of about 110° C. At this time 0.104 part per hour of a mixture of oxygen and ozone containing about 2 percent by weight of the latter was added to the reaction mixture for a period of one hour. At this time the ozone generator was cut off while the oxygen flow was continued for an additional 9 hours. At the end of this time the reaction mixture was cooled to about room temperature and the precipitated isophthalic acid was separated and was equivalent to a 53 percent yield of that material. The reaction mixture was then reheated to the reflux temperature, 0.164 additional part of m-xylene was added and 0.104 part per hour of pure oxygen was added for 10.5 hours. The reaction mixture was cooled, the precipitated isophthalic acid was filtered off and oxygen at the same rate was added for 24 additional hours after adding 0.164 more part of xylene and reheating the solution. After this step the solution was cooled, the isophthalic acid was separated, and the reaction was carried out for 20 additional hours with the same oxygen rate after 0.164 part of xylene was again added. At the end of this time the reaction mixture was cooled and the reaction products as well as unreacted m-xylene was collected. Analysis of the product showed a yield of about 78 percent of isophthalic acid and 11 percent of m-toluic acid. The yield was calculated on the basis of the amount of m-xylene added during the reaction less the amount of unreacted m-xylene carried out of the system with the exit gases.

Example 5

This example illustrates the oxidation of o-xylene to o-phthalic and o-toluic acids. One part of acetic acid, 0.053 part of o-xylene and 0.025 part of cobaltous acetate tetrahydrate were mixed and heated to the reflux temperature of about 105 to 110° C. At this time 0.255 part per hour of a mixture of ozone and oxygen containing about 2 percent by weight of ozone were passed into the reaction mixture for 7.5 hours. At the end of this time the reaction mixture was cooled and the o-toluic and o-phthalic acids were isolated. The conversion of o-xylene to o-toluic acid was 61 percent and the conversion to o-phthalic acid was 18 percent.

Example 6

This example illustrates the use of air instead of pure oxygen as the oxidizing agent in the present process. A mixture of 1 part acetic acid, 0.041 part of p-xylene and 0.0238 part of cobaltous acetate tetrahydrate was heated to the reflux temperature of about 105° C. At this time about 0.5 part per hour of the mixture of oxygen and ozone containing about 2 percent by weight of ozone was added to the reaction mixture. After about 1¼ hours, the oxygen-ozone feed was terminated and about 0.371 part per hour of air was substituted. This air was fed to the reaction for about 4 hours. At the end of this time the reaction mixture was cooled and analysis of the products showed the conversion of the p-xylene to about 14 percent of terephthalic acid and 63 percent of p-toluic acid.

*Example 7*

This example illustrates the conversion of p-toluic acid to terephthalic acid by the process of the present invention. A mixture of 1 part of acetic acid, 0.0635 part of p-toluic acid and 0.0317 part of cobaltous acetate tetrahydrate was heated with stirring to the reflux temperature of about 110° C. About 0.114 part per hour of a mixture of oxygen and ozone containing about 2 percent by weight of the latter was then passed into the reaction mixture for a period of 6 hours. At the end of this time the products were analyzed and revealed a 74 percent conversion of the p-toluic acid to terephthalic acid.

*Example 8*

This example illustrates the conversion of toluene to benzoic acid by the process of the present invention. A mixture of 1 part acetic acid, 0.275 part of toluene and 0.0317 part of cobaltous acetate tetrahydrate was heated to the reflux temperature of about 107° C. At this time a mixture of 0.114 part per hour of a mixture of oxygen and ozone containing about 2 percent by weight of the latter was added to the reaction mixture for a period of about 7 hours. Analysis of the resulting product showed that the conversion of toluene to benzoic acid was equal to about 35 percent.

*Example 9*

Following the procedure previously outlined, a mixture of 1 part of acetic acid, 0.06 part of p-methoxy toluene and 0.03 part of cobaltous acetate tetrahydrate was heated to the reflux temperature of about 110° C. At this time 0.179 part per hour of a mixture of ozone and oxygen containing about 2 percent by weight of ozone was added to the reaction mixture for 2 hours. At the end of this time the ozone generator was cut off and the oxygen was continued for an additional 2 hours. Analysis of the reaction products showed a conversion of 82 percent of the p-methoxy toluene to p-methoxy benzoic acid.

*Example 10*

A mixture of 1 part of acetic acid, 0.06 part of mesitylene (1,3,5-trimethylbenzene) and 0.03 part of cobaltous acetate tetrahydrate was heated to its reflux temperature of about 112° C. At this time 0.215 part per hour of a mixture of oxygen and ozone containing about 2 percent by weight of the latter was added to the reaction mixture for 3.7 hours. At the end of this time the ozone generator was cut off and the pure oxygen was continued for an additional 4.3 hours. At the end of this time the reaction products were isolated showing about 45 percent conversion of the starting material to uvitic acid (5-methylisophthalic acid) and 45 percent conversion to mesitylenic acid (3,5-dimethyl benzoic acid).

*Example 11*

A mixture of 1 part of acetic acid, 0.0681 part of 5-t-butyl-m-xylene and 0.0273 part of cobaltous acetate tetrahydrate was heated to its reflux temperature of 112° C. at which time about 0.160 part per hour of a mixture of oxygen and ozone containing about 2 percent by weight of ozone was passed to the reaction mixture for 1.5 hours. At this time the ozone generator was removed from the circuit and pure oxygen at the same rate was added for an additional 6.5 hours. Analysis of the products showed that there had been a 72 percent conversion of the starting material to t-butyl toluic acids and a conversion of about 18 percent to 5-t-butylisophthalic acid.

*Example 12*

This example illustrates the reaction of the present invention at a relatively low temperature. A mixture of 1 part of acetic acid, 0.0818 part of p-xylene and 0.0381 part of cobaltous acetate tetrahydrate was left at room temperature while 0.341 part per hour of a mixture of oxygen and ozone containing about 2 percent by weight of ozone was passed into the reaction mixture for a 2.50 hour period. During this time the temperature of the reaction mixture increased from room temperature to a final temperature of about 45° C. At the end of this time the reaction products were examined and revealed that none of the p-xylene had been converted to terephthalic acid but that 14.5 percent had been converted to p-toluic acids. This example shows that the reaction proceeds at relatively low temperatures but that the rate is relatively slow.

The following two examples illustrate the effect of water on the process of the present invention.

*Example 13*

A mixture of 1 part of acetic acid, 0.055 part of p-xylene and 0.0278 part of cobaltous acetate tetrahydrate was heated to its reflux temperature of about 107° C. A mixture of 0.199 part per hour of oxygen and ozone containing 2 percent by weight of the latter was added to the reaction mixture for 1.50 hours. At the end of this time 0.199 part of pure oxygen was added to the mixture for an additional three hours. During the course of the reaction 0.1 part of water was added. This reaction proceeded satisfactorily with the characteristic green color indicative of the presence of the cobaltic ion and the p-xylene was converted to p-toluic acid and terephthalic acid.

*Example 14*

In this example the general procedure of Example 13 was followed except that 0.15 part of water was added during the course of the reaction per part of acetic acid. Specifically, a mixture of 1 part of acetic acid, 0.075 part of p-xylene and 0.353 part of cobaltous acetate tetrahydrate was heated to its reflux temperature of 110° C. A mixture of 0.253 part of oxygen and ozone containing about 2 percent by weight of the latter was added to the reaction mixture for 3.2 hours. At the end of this time pure oxygen at the same rate was added for an additional one-half hour. During the course of the reaction 0.15 part of water was added. As soon as the water was added the reaction stopped and no conversion of the p-xylene to either p-toluic acid or terephthalic acid was obtained.

From the foregoing examples and the general description of my invention it is obvious that my process is applicable to continuous operation. Thus, where it is desired to convert m-xylene to isophthalic acid, a reaction mixture is made up of m-xylene, acetic acid and a cobaltous catalyst and after initiation of the oxidation reaction with ozone both oxygen addition and m-xylene addition is continued. The isophthalic acid which is formed, precipitates from the solution and may be continuously withdrawn.

Although the foregoing examples have described a large number of variations and modifications of the proportions of ingredients and reaction conditions which may be employed in the practice of the present invention, it should be understood that my reaction is also applicable to reactants, reaction conditions, and proportions of ingredients which are not specifically illustrated by the examples.

The acids prepared by the method of this invention exhibit the same utility as the same acids prepared by any other method. Thus, these acids may be esterified to serve as plasticizers for resinous materials such as polyvinyl chloride, polyvinyl acetate, etc. In addition, the dibasic acids prepared by my process may be reacted with polyhydric alcohols in conventional methods to form polyester resins.

What I claim as new and desire to secure by Letters Patent of the United States is:

1. The method of forming aromatic carboxylic acids which comprises passing a mixture of oxygen and ozone into a solution of an aralkyl compound in acetic acid in the presence of a cobaltous catalyst at a temperature of from room temperature up to about 130° C., said ozone being the sole oxidation initiator employed in said method.

2. The method of claim 1 in which the water content of the reaction mixture is maintained below about 0.1 part by weight of water per part of acetic acid.

3. The method of claim 1 in which the aralkyl compound is an alkyl benzene.

4. The method of preparing an aromatic carboxylic acid which comprises (a) passing ozone into a solution of an aralkyl compound and a cobaltous catalyst in acetic acid at a temperature of from room temperature up to about 130° C. until the solution turns green and (b) passing substantially pure oxygen into said solution until oxidation of the aralkyl compound to aromatic carboxylic acids is completed, said ozone being the sole oxidation initiator employed in said method.

5. The method of claim 4 in which water formed during the reaction is removed from the reaction mixture during the course of the reaction.

6. In the oxidation of aralkyl compounds to aromatic carboxylic acids in the presence of a cobaltous catalyst and acetic acid at a temperature of from room temperature up to about 130° C., the improvement which comprises initiating said oxidation with ozone, said ozone being the sole oxidation initiator employed.

7. The method of forming o-toluic and o-phthalic acids which comprises passing a mixture of ozone and oxygen into a solution of o-xylene and a cobaltous catalyst in acetic acid at a temperature of from room temperature up to about 130° C., said ozone being the sole oxidation initiator employed in said method.

8. The method of forming a mixture of terephthalic acid and p-toluic acid which comprises (a) heating a solution of p-xylene and a cobaltous catalyst in acetic acid to a temperature of from about 90 to 115° C. and (b) passing a mixture of ozone and oxygen into said heated solution said ozone being the sole oxidation initiator employed in said method.

9. The method of forming terephthalic acid which comprises heating a solution of p-toluic acid and cobaltous acetate tetrahydrate in acetic acid to a temperature of from about 90 to 115° C. and thereafter passing a mixture of ozone and oxygen into said reaction mixture, said ozone being the sole initiator employed in said method.

10. The method of forming a mixture of isophthalic acid and m-toluic acid which comprises heating a solution of m-xylene and cobaltous acetate tetrahydrate in acetic acid to a temperature of about 105–110° C. and thereafter passing a mixture of ozone and oxygen into said solution said ozone being the sole oxidation initiator employed in said method.

11. The method of oxidizing the methyl groups of 5-t-butyl-m-xylene to carboxyl groups which comprises heating a mixture of t-butyl-m-xylene and cobaltous acetate tetrahydrate in acetic acid at its reflux temperature while passing a mixture of oxygen and ozone through said refluxing solution said ozone being the sole oxidation initiator employed in said method.

References Cited in the file of this patent

UNITED STATES PATENTS

| | | |
|---|---|---|
| 2,245,528 | Loder | June 10, 1941 |
| 2,479,067 | Gresham | Aug. 16, 1949 |
| 2,673,217 | Hull | Mar. 23, 1954 |

OTHER REFERENCES

Paillard et al.: Helv. Chim. Acta, 25, pp. 1528–1533 (1942).